United States Patent [19]

Baker

[11] 4,410,549

[45] Oct. 18, 1983

[54] PREPARATION OF A LOW CALORIE, LOW FAT FRUIT-CONTAINING YOGURT

[75] Inventor: Donald B. Baker, Tulsa, Okla.

[73] Assignee: The Pro-Mark Companies, Tulsa, Okla.

[21] Appl. No.: 319,891

[22] Filed: Nov. 10, 1981

Related U.S. Application Data

[63] Continuation-in-part of Ser. No. 272,350, Jun. 10, 1981, abandoned, which is a continuation of Ser. No. 80,151, Sep. 28, 1979, abandoned.

[51] Int. Cl.$^3$ ............... A23C 9/123; A23C 9/133
[52] U.S. Cl. ............... 426/43; 426/583; 426/588; 426/522
[58] Field of Search ............... 426/34, 42, 43, 583, 426/522, 588

[56] References Cited

U.S. PATENT DOCUMENTS

| | | | |
|---|---|---|---|
| 3,269,842 | 8/1966 | Mayer et al. | 426/43 |
| 3,969,534 | 7/1976 | Pavey et al. | 426/34 |
| 4,096,287 | 6/1978 | Kemp | 426/588 |
| 4,110,476 | 8/1978 | Rhodes | 426/43 X |

OTHER PUBLICATIONS

Kositowski, F., Cheese and Fermented Milk Foods, published by the Author, Ithaca, N.Y., 1966, (pp. 47–59).

Webb et al., Byproducts From Milk, 2nd Ed., The Ari Publishing Co., Inc., Westport, Conn., 1970, (pp. 38–40).

Jenness et al., Principles of Dairy Chemistry, John Wiley & Sons, Inc., 1959, (pp. 305–308).

*Primary Examiner*—David M. Naff
*Attorney, Agent, or Firm*—Sixbey, Friedman & Leedom

[57] ABSTRACT

A low calorie, low fat fruit-containing yogurt is prepared by a process including steps of admixing skim milk, stabilizers and an amount of heat modified nonfat dry milk solids effective to improve texture and flavor, and processing the mixture by heating, homogenizing, fermenting with a culture mixture of *Lactobacillus acidophilus, Lactobacillus bulgaricus* and *Streptococcus thermophilus*, blending with low calorie fruit preserves and cooling. The heat modified nonfat dry milk solids is derived from a process in which condensed skim milk is subjected to non-coagulative direct steam heating prior to spray drying. The resultant yogurt product has the appearance, texture and taste of conventional fruit-containing yogurt.

10 Claims, No Drawings

4,410,549

PREPARATION OF A LOW CALORIE, LOW FAT FRUIT-CONTAINING YOGURT

CROSS REFERENCE TO RELATED APPLICATIONS

This application is a continuation-in-part of pending U.S. application Ser. No. 272,350, filed June 10, 1981, now abandoned which application is a continuation of U.S. application Ser. No. 080,151, filed Sept. 28, 1979, now abandoned.

BACKGROUND OF THE INVENTION

1. Field of the Invention

The present invention relates generally to a method for making a fruit-containing yogurt product having the appearance, texture and taste of conventional custard-type fruit-containing yogurt and, more specifically, to a method for making a fruit containing yogurt product having a fat, carbohydrate and calorie content significantly below that of conventional fruit-containing yogurt.

2. Description of the Prior Art

In recent years cultured milk products, referred to as yogurt, have enjoyed immense popularity. The beneficial effects on health due to the therapeutic properties of the bacterial cultures contained in yogurt are well known. In addition, yogurt has become a popular food among dieters. To increase its appeal, the sharp, tangy taste characteristic of plain, unflavored yogurt, which heretofore made yogurt unacceptable to many people, has been masked in many yogurt products with fruit and sweeteners. This practice has resulted in a flavored yogurt product that is more palatable to a wider segment of the population. However, the use of these additives has been accompanied by an increase in product calorie content from about 90 calories per eight ounce (224 grams) serving of plain, unflavored yogurt to about 250 to 270 calories per eight ounce (224 grams) serving of the sweetened, fruit-containing yogurt. Such a high calorie content renders the fruited product generally unsuitable for inclusion in reducing diets since the fruit yogurt uses up the majority of the calories usually alloted to a single meal. As a result the dieter has difficulty choosing a sufficient variety or quantity of foods to form a balanced meal within the remaining calories allowed. Accordingly, a need has developed for a fruit-containing yogurt product which is low in calories, fat and carbohydrate content.

Prior methods for producing sweetened or flavored yogurt have succeeded in obtaining a product with a relatively low butterfat content, for example, as low as the 0.5% butterfat content of ordinary skim milk, but none seem to have been able to produce a really low fat, less than about 0.5%, yogurt product having the characteristic creamy custard-type yogurt consistency while at the same time overcoming the high calorie and high carbohydrate problems accompanying the use of fruited or flavored yogurt. One reason for this is that yogurt previously made from really low fat milk products, less than about 0.5% butterfat, has been loose and watery and lacking in flavor rather than creamy and custard-like with consumer acceptable flavor, appearance and mouth feel. Efforts to overcome this problem to obtain a palatable product have either required adding flavor influencing milk solids, which increases the yogurt calorie content, or increasing the milk fat content, which has a similar effect.

Exemplary of prior methods for producing flavored yogurt is U.S. Pat. No. 3,969,534 to Pavey et al which teaches the production of the fruited, flavored yogurt which has relatively low, about 0.5% butterfat content. However, the product produced by the Pavey method does not appear to be low in carbohydrates or significantly lower in calories than conventional flavored yogurt. In U.S. Pat. No. 3,025,165, Metzger discloses a process for producing yogurt which uses relatively low butterfat starting materials, such as skim milk, to which is added about 1.5% to 6.4% of an unsaturated vegetable oil. As a result, a higher than desirable fat content for a reducing diet is obtained without significantly reducing the number of calories. Likewise, the fruited yogurt product produced by the process disclosed in U.S. Pat. No. 3,269,842 to Mayer et al has a fat content of about 4% and appears to be a high calorie, high carbohydrate product. Donay et al in U.S. Pat. No. 3,128,190, disclose the use of a skim milk starting material. However, the process for making Donay's fruit-containing yogurt requires fruit which is precooked with sucrose to prevent fermentation thereof by the yogurt cultures with resultant unpleasant flavors. As a result of this procedure the Donay et al method neither produces really low fat yogurt nor reduces the high calorie and carbohydrate content of fruit-containing yogurt. In U.S. Pat. No. 4,110,476, Rhodes discloses a process for preparing liquid, rather than custard-type, yogurt products which utilize whey protein concentrate together with milk products as the starting material ingredients and contain higher sugar contents than are desirable for a fruit-containing yogurt product suitable for a reducing diet.

SUMMARY OF THE INVENTION

It is, therefore, a primary object of the preset invention to provide a fruit-containing yogurt product which resembles conventional yogurt in appearance, texture and taste, but which has a fat, carbohydrate and calorie content significantly below that of known custard-type yogurt products.

It is still another object of the present invention to provide a fruit-containing, custard-type yogurt product which is nutritionally equivalent to an average serving of milk and fruit, but is sufficiently low in fat, carbohydrate and calories to be included as a desirable component of a reducing diet.

It is still another object of the present invention to provide a nutritious, palatable, fruit-containing yogurt product which has the creamy mouth feel and the sweet, fruity, slightly tangy taste of conventional custard-type yogurt but which has a fat content below about 0.2% by weight of the final product and a carbohydrate content below about 1% by weight of the final product.

It is yet another object of the present invention to provide a method for making a very low fat, low carbohydrate, low calorie fruit-containing, custard-type yogurt product.

Other objects and advantages will become apparent from the following description and appended claims.

In accordance with the aforesaid objectives, the present invention provides a process for making a low fat, low carbohydrate, low calorie, fruit-containing, custard-type yogurt product resembling conventional fruit-containing yogurt in appearance, texture and taste which includes the steps of admixing pasteurized skim milk having a fat content of less than about 0.2%, preferably less than about 0.1%, with suitable stabilizers and specially heat modified nonfat dry milk solids; adding optional vitamin and mineral fortification, sweeteners, flavorants and/or colorants; heating the resulting mixture with constant agitation to about 190° to 195° F. (87.7° to 90.6° C.) for about 20 to 60 minutes; adding optional heat labile vitamins, such as Vitamin C; and homogenizing the mixture under conventional elevated pressure conditions at 500 to 5000 psig (35.15 to 351.5 kg/cm$^2$), desirably 1000 to 2000 psig (70.03 to 140.06 kg/cm$^2$) and preferably at 1200 to 1500 psig (84.36 to 105.45 kg/cm$^2$). The homogenized mixture is cooled to about 90° to 120° F. (32.2° to 48.9° C.), preferably 110° F. (43.3° C.), and innoculated with a uniquely proportioned blend of standard yogurt cultures.

If it is desired to produce a Swiss style yogurt which has pieces of fruit homogeneously mixed throughout and a predominantly fruity flavor, the innoculated mixture is maintained at this temperature until the desired taste and custard body are achieved, which is usually at a pH of about 4.5 to 4.7. The yogurt is then cooled to about 50° to 75° F. (10° to 23.9° C.), preferably 65° to 70° F. (18.3° to 21.1° C.), and pumped through a small orifice, such as a screw or pressure valve, to break up small pieces of coagulant which are present and to produce a smooth, continuous mass, all as is well known in the art. Low calorie, low carbohydrate fruit preserves are thoroughly blended into the custard, and the resulting product is packaged in suitable individual containers and refrigerated at temperatures sufficiently low to stop fermentation, generally 35° to 50° F. (1.6° to 10° C.). The resulting low calorie, low carbohydrate, low fat product, which resembles conventional Swiss style yogurt with its smooth, creamy texture and slightly tangy fruity flavor, contains pieces of fruit suspended throughout.

If it is desired to produce Western style yogurt in which a deep layer of plain or unflavored yogurt custard covers a shallow layer of fruit preserves, the innoculated milk-stabilizer-milk solids-vitamin-flavorant mixture is pumped into individual containers, such as conventional 8 ounce (224 gram) yogurt containers to which has already been added 1.0 ounce (28 gram) of low calorie fruit preserves. The containers are than maintained at about 110° F. (43.3° C.) until the desired taste and custard body has been achieved, which is usually when the pH of the yogurt is about 4.5 to 4.7, and are then cooled to a temperature sufficiently low to stop fermentation, generally 35° to 50° F. (1.6° to 10° C.), preferably to conventional refrigeration temperatures, until ready for sale. The resulting low calorie, low fat product has a smooth, creamy custard texture and, unless sweetners have been added, a typical tart yogurt taste which becomes sweet and predominantly fruity only when the preserves at the bottom are stirred into the yogurt custard.

The low calorie, low fat custard-type fruit-containing yogurt product of the present invention comprises a major amount of pasteurized, homogenized cultured skim milk and minor amounts of low calorie fruit preserves, stabilizers, vitamins, minerals and flavorants. Most importantly, the product of the present invention has a total fat content by weight of less than about 0.2%, preferably less than about 0.1%, a total carbohydrate content by weight of less than about 1%, preferably about 0.4%, and contributes only about 150 calories per eight ounce (224 gram) serving to the diet. Desirably, the product has a pH in the range 4.3 to 4.6, a total solids content of about 19%, and contains about 15% to 20% by weight fruit.

DETAILED DESCRIPTION OF THE INVENTION

The present invention relates broadly to a low fat fruit-containing yogurt product which resembles conventional custard-type fruit-containing yogurt in appearance, texture and taste, but which has fat, calorie and carbohydrate contents substantially reduced below those of conventional yogurt. As a result, the yogurt made by the method of the present invention is suitable for inclusion in the diets of persons for whom a reduced intake of fat, carbohydrates or calories is necessary or desirable.

The process by which the fruit-containing yogurt product of the present invention is made involves admixing pasteurized skim milk, stabilizers and specially heat modified nonfat dry milk solids; adding vitamins and minerals, sweeteners, flavorants and/or colorants to the admixture; heating the resulting mixture to a temperature of about 190° F. to 195° F. (87.7° to 90.6° C.); adding optional heat labile vitamins, such as Vitamin C; and homogenizing the resulting mixture by conventional homogenization means. The homogenized mixture is then cooled to a temperature of about 90° to 120° F. (32.2° to 48.9° C.), preferably 110° F. (43.3° C.) and innoculated with a uniquely proportioned blend of standard lactic acid producing yogurt cultures. Depending on whether a Swiss style or a Western style yogurt is desired, the innoculated mixture is maintained at this temperature in the bulk mixing vat until the desired taste and texture are achieved, then cooled to about 50° to 75° F. (10° to 23.9° C.), pumped through a screw or pressure valve and admixed with fruit preserves prior to packaging and refrigeration (Swiss style) or placed in conventional yogurt containers to which fruit has already been added and maintained at about 110° F. (43.3° C.) while in the containers until the product has achieved an acceptable taste and texture before being cooled at conventional refrigeration temperatures (Western style).

In order to prepare a yogurt product having a fat content not greater than about 0.2% by weight the use of fat contributing ingredients must be carefully controlled. Inasmuch as the primary fat contributing ingredient in yogurt is generally milk, a low fat content may be achieved by selecting a skim milk with a butterfat content of less than about 0.2% by weight, and preferably less than about 0.1% by weight, for use in the process of the present invention. The term "milk" as used herein means the conventional milk of commerce (butterfat content ranging from about 0.1% to 7% by weight) as well as equivalent compositions formed by suitable admixtures of milk solids and water.

The primary carbohydrate contributing ingredients in yogurt are sugars, which may be added to the yogurt custard to flavor it or, more typically, are added in the preparation of the fruit component. Typically, the fruit added to yogurt resembles fruit preserves having discrete pieces of fruit or whole berries in a thickened sugar syrup. Fruit in this form effectively masks the flavor of the yogurt with a predominantly sweet, fruity taste and is less likely to be fermented by the yogurt bacteria. To prepare a fruit-containing yogurt having a carbohydrate content of less than about 1% by weight, the amount of sugar added to the yogurt custard or used in the preparation of the fruit must be carefully regulated. In the past, this has presented a problem since use of less than about 1% by weight of the final product of sucrose, the sugar form most commonly used to prepare fruit for use in yogurt products, does not result in a sufficiently sweet product.

The process of the present invention achieves a low carbohydrate fruit containing yogurt product by utilizing fruit which has been prepared to resemble the preserves heretofore used in conventional yogurt, but which have been prepared with monosaccharide sugars having high sweetening effects, instead of sucrose. For example, the use of fructose, a monosaccharide with a sweetening effect substantially greater than that of sucrose, to form the syrup results in fruit preserves which are as sweet as those prepared with sucrose but which have a substantially lower carbohydrate level. A preferred fruit preserve preparation which has been found to achieve the desired results contains 40% to 50% by weight fruit pieces or whole berries cooked in a syrup made from invert sugar containing at least 36% fructose thickened with pectin. The resulting preserves contain about 41% to 47% solids, are at the normal pH for the specific fruit used, and contain not more than 825 calories per pound (about 1817 calories per kg) of preserves. Any of the fruits and berries commonly used in conventional fruit-containing yogurt products, such as strawberries, blueberries, cherries and the like, may be prepared for use in the product of the present invention. The combination of a low level of carbohydrates and a low level of fat results in a yogurt product having significantly fewer calories than prior products.

To prepare the low calorie fruit-containing yogurt of the present invention, pasteurized skim milk having a fat content of less than about 0.2% by weight, preferably less than about 0.1% by weight, is placed in a stainless steel mixing vat or like container. The skim milk may have been pasteurized by any conventional means, although it is preferred to use skim milk which has been pasteurized by the high temperature, short time (HTST) method. To the skim milk are added stabilizers and nonfat dry milk solids. A preferred combination of stabilizers which has been found to be successful contains agar, pectin, guar gum and gelatin. However, other commonly used commercially available dairy stabilizers could also be utilized, either alone or in combination. The stabilizer or combination of stabilizers comprise less than about 1.0%, preferably about 0.7%, by weight of the final product. The nonfat dry milk solids comprise up to about 2%, preferably about 1.2%, by weight of the final product. In order to achieve the low fat, low carbohydrate and low calorie levels of the yogurt of the present invention yet prepare a custard-type product having a creamy consumer acceptable appearance and mouth feel rather than the loose and watery consistency of previously attempted low fat yogurt products, the dry milk solids should be of the heat modified type. Such a modified milk solids product is commercially available from a number of manufacturers. Exemplary of suitable products are "PMC" available from Pro-Mark Co. of Tulsa, Okla., "Hi-Sorb" available from MPI Division of Stauffer Chemical Company, Inc. and "Crest Lac" available from Crest Foods Co., Inc. of Ashton, Ill. Each of these products is a grade-A conventional nonfat dry milk product which has been modified primarily by heat for the purpose of increasing the hydration of the protein and for making the product more effective in transmitting texture and flavor. See, for example, U.S. Pat. No. 4,096,287 for a discussion of acceptable methods for preparing the nonfat dry milk product including the essential step of non-coagulative direct steam heating of condensed skim milk prior to spray drying for modifying the milk protein. It has been found convenient to premix the stabilizers and nonfat dry milk solids in the amounts normally used for production so that the nonfat dry milk solids serve as a carrier for the stabilizers. In this connection, as previously indicated, it is acceptable to use admixtures of nonfat dry milk solids and water in lieu of the skim milk in the process of the present invention. If this is done, preparation of the milk starting ingredient must be consistent with the desired 17 to 20% by weight, preferably about 19% by weight, total solids in the final product.

It is desirable to fortify the fruit-containing yogurt product of the present invention with vitamins and minerals so that an eight ounce (224 gram) serving is nutritionally equivalent to a single serving of milk, which is usually eight ounces (224 gram), and a single serving of fruit, which varies according to the kind of fruit. Such fortification, while not essential to the present invention, results in a product of greater nutritional value than a non-fortified product and facilitates the intake of the recommended daily allowances of these vitamins and minerals. Heat labile vitamins and minerals, such as Vitamin C which is destroyed by prolonged high temperatures, should not be added at this stage of the process, but are preferably added at a later time after high temperature heating has taken place.

As this stage in the process, particularly if the end product is to be a Western style yogurt in which the fruit is on the bottom, it may be desirable to add a sweetener, flavor enhancer or colorant. Addition of one or any combination of these ingredient materials produces a yogurt custard that is sweet, flavored and/or colored without the fruit being stirred therethrough. Any sweetener used must not, in combination with the sweetened fruit, exceed the required carbohydrate level limitation of less than 1% by weight of the product. It is preferred, therefore, to use as the added sweetener fructose or a similar high sweetening monosaccharide. Any one of a number of commercially available and well known flavor enhancers and/or certified food grade colorings may also be used.

The skim milk-stabilizer-nonfat dry milk solids mixture, which may contain vitamins, minerals, sweeteners, flavorants and/or colorants is heated to a temperature in the range from about 190° to 195° F. (87.7° to 90.6° C.) for a time sufficient to form a uniform, substantially homogeneous mixture and to pasteurize the mixture, usually about 20–60 minutes. Heat treating at this high temperature denatures the milk protein, causing water in the mixture to be absorbed and helps to create a thicker, richer product having a custard-type body and texture. The heat labile vitamins and minerals, such as Vitamin C, may be added once the heat treatment at 190°–195° F. (87.7° to 90.6° C.) is complete and the mixture has cooled below the temperature at which the particular vitamin and/or mineral might be adversely affected. The mixture is then homogenized by conventional homogenization means at about 500–5000 psig (35.15 to 351.5 kg/cm$^2$), desirably 1000 to 2000 psig (70.03 to 140.06 kg/cm$^2$), and preferably 1200 to 1500 psig (84.36 to 105.45 kg/cm$^2$), after which it is cooled to an optimum culturing temperature, generally in the range 90° to 120° F. (32.2° to 48.9° C.) and preferably about 110° F. (43.3° C.) in preparation for bacterial innoculation, although the temperature may vary slightly according to the bacterial culture or cultures used.

The pasteurized, homogenized mixture is innoculated with a uniquely proportioned blend of lactic acid producing bacterial cultures commonly used in yogurt production in order to confer upon the final yogurt product the proper combination of acidity, tartness and body appropriate for a custard-type yogurt product. Preferred as constituents of the customized yogurt culture for use in the process of the present invention are *Lactobacillus bulgaricus, Streptococcus thermophilus* and *Lactobacillus acidophilus.* It has been found that when all three of these bacterial cultures are simultaneously employed in predetermined proportions, even very low fat milk-containing mixtures can be cultured to achieve the important custard-type creamy body and mouth feel of conventional yogurt while, at the same time, achieving the desired tartness and acidity. This cannot be successfully achieved with other than all three bacterial cultures employed in the following proportions by weight:

*Lactobacillus acidophilus:* 30–50%
*Lactobacillus bulgaricus:* 25–35%
*Streptococcus thermophilus:* 25–35%

The proper combination of cultures is generally determined by the amount of *Lactobacillus acidophilus* required to culture the low fat milk mixture to a stringy, rubbery body texture which will yield an acceptable custard-type creamy mouth feel. The *Lactobacillus bulgaricus* and *Streptococcus thermophilus* comprise the balance of the culture in about equal proportions.

To this point in the process there is no significant difference in processing between the preparation of Swiss style yogurt, which has a predominantly fruity flavor and contains pieces of fruit uniformly dispersed throughout the yogurt custard, and the preparation of Western style yogurt, which has a shallow layer of fruit preserves on the bottom of the yogurt container covered by a deep layer of yogurt custard. The primary difference in processing the two types is that the Swiss style is cultured in the bulk mixing vat before packaging while the Western style is cultured in the individual containers in which it is packaged.

If a Swiss style yogurt is desired, the cultured mixture is maintained at about 110° F. (43.3° C.) until a yogurt custard with an acceptable body and taste is produced. Although taste and texture are highly subjective and will vary from producer to producer, experience has shown that when the product reaches a pH in the range of about 3.8 to 4.8, preferably about 4.5 to 4.7, which typically takes about two to four hours, an acceptably firm yogurt custard with a pleasantly sharp, tangy taste has been produced. When an acceptable product from the standpoint of taste and texture has been produced, the yogurt is cooled to about 50° to 75° F. (10° to 23.9° C.), preferably about 65° to 70° F. (18.3° to 21.1° C.), to slow the fermentation while maintaining a sufficiently fluid mixture so that it can be readily pumped through a screw or pressure valve. The cooled mixture is then pumped through a screw or pressure valve to achieve a smooth texture. Fruit preserves prepared with high sweetening monosaccharides, preferably fructose, are thoroughly blended into the yogurt custard, preferably at a level of about 15% to 20% by weight fruit in the final product. The resulting product is packaged in conventional yogurt containers and held at conventional refrigeration temperatures, preferably about 35° to 40° F. (1.6° to 4.4° C.), to fully terminate fermentation. When maintained under conventional refrigeration temperatures, the product has a shelf like of about 30 days.

If a Western style yogurt is desired, about one ounce (28 grams) of fruit preserves prepared with high sweetening monosaccharides, preferably fructose, is placed in the bottom of conventional eight ounce (224 gram) yogurt containers. On top of this is added about seven ounces (196 grams) of the culture-containing, pasteurized, homogenized mixture. The fruit comprises preferably about 15% to 20% by weight of the final product. The filled containers are maintained at about 110° F. (43.3° C.) until an acceptable taste and texture are produced in the yogurt custard. If a sweetener has been added to the yogurt mixture this may affect somewhat the perception of when an acceptable yogurt taste has been achieved. However, as with the Swiss style yogurt, the notion of what constitutes a suitable product is likely to vary, with acceptable results generally reached when the pH of the product is about 3.8 to 4.8, preferably 4.5 to 4.7. This pH level is generally reached in about two to four hours. The containers are thereafter cooled to and maintained at conventional refrigeration temperatures to stop the fermentation, preferably 35° to 40° F. (1.6° to 4.4° C.). Under these conditions, the product has a shelf life of about 30 days.

The following examples illustrate the practice of the present invention and are intended to exemplify and not to limit in any respect the content and scope thereof.

EXAMPLE I

A low calorie, low fat Swiss style yogurt was prepared in the following manner:

2125 pounds (964.75 kg) of HTST pasteurized skim milk (less than 0.2% by weight butterfat) was placed in a stainless steel culturing vat equipped with an agitator. To this milk was added 40 pounds (18.16 kg) of a premixed stabilizer-nonfat dry milk mixture which contained about 8 pounds (3.63 kg) of a mixture of agar, pectin, guar gum and gelatin and about 32 pounds (14.53 kg) of "PMC" brand heat modified nonfat dry milk solids, and a mixture of vitamins (except Vitamin C) and minerals in quantities which, in the final product, would be the nutritional equivalent to those contained in an 8 ounce (224 gram) serving of milk and an average serving of fruit. The resulting mixture was thoroughly blended and vat pasteurized at 190° to 195° F. (87.7° to 90.6° C.) for 30 minutes. Vitamin C was added and the mixture was homogenized at 1500 psig (105.45 kg/cm$^2$). The homogenized mixture was then cooled to about 110° F. (43.3° C.), innoculated with a mixture, by weight, of 40% *Lactobacillus acidophilus,* 30% *Lactobacillus bulgaricus* and 30% *Streptococcus thermophilus* cultures and maintained in the vat at this temperature until the mixture reached a pH of about 3.8 to 4.8 and had an acceptable custard consistency. The yogurt was cooled to about 65° to 70° F. (18.3° to 21.1° C.) and then pumped through a pressure valve to give it a smoother texture. Five hundred pounds (227 kg) of blueberry preserves having less than 825 calories per pound (1817 calories per kg) were mixed into the yogurt custard. The blueberry preserves contained 40% to 50% by weight whole blueberries in a syrup made from invert sugar containing at least 36% to 38% fructose to which pectin had been added to thicken it. The resulting low calorie, low carbohydrate, low fat yogurt had a smooth, creamy texture, contained blueberries uniformly mixed throughout, was the color of blueberries mixed with cream and had a predominantly sweet blueberry taste in combination with a slightly sharp and tangy yogurt taste. The product was packaged in conventional eight ounce yogurt cups, contained 150 calories, 0.2% by weight fat, 0.4% by weight carbohydrate, 4% by weight protein and 19% by weight solids per eight ounce (224 gram) serving, and remained stable for about 30 days at 35° to 40° F. (1.6° to 4.4° C.).

EXAMPLE II

A low calorie, low fat Western style yogurt was prepared in the following manner:

2202 pounds (999.7 kg) of HTST pasteurized skim milk (less than 0.2% by weight butterfat) was placed in a stainless steel vat equipped with an agitator. To this milk was added 93 pounds (42.22 kg) of invert sugar which contained 36% to 38% fructose, minor amounts of flavor enhancers and certified color, 40 pounds (18.16 kg) of the same premixed stabilizer-nonfat dry milk additive used in Example I and a substantially identical mixture of vitamins and minerals as in Example I. The resulting mixture was thoroughly blended and vat pasteurized at 190° to 195° F. (87.7° to 90.6° C.) for 30 minutes. Vitamin C was then added and the mixture was homogenized at 1500 psig (105.45 kg/cm$^2$). The homogenized mixture was cooled to about 110° F. (43.3° C.) and innoculated with a mixture, by weight of 40% *Lactobacillus acidophilus,* 30% *Lactobacillus bulgaricus* and 30% *Streptococcus thermophilus* cultures. 335 pounds (152.09 kg) of blueberry preserves in an invert sugar syrup was prepared as described in Example I and one ounce (7-8 grams) of these preserves was pumped into each of a number of conventional eight ounce (224 gram) yogurt cups. The cups were then filled with the innoculated 110° F. (43.3° C.) homogenized mixture and maintained at 110° F. (43.3° C.) until the yogurt reached a pH of about 3.8 to 4.8 and had an acceptable custard consistency. The cups were cooled to 35° to 40° F. (1.6° to 4.4° C.), at which temperature the product remained stable for about 30 days. The resulting low calorie, low carbohydrate, low fat yogurt had a smooth, creamy texture which had a slightly sweet, predominantly sharp yogurt taste before the preserves were stirred up from the bottom. This yogurt looked and tasted like the Swiss style and had the same calorie, fat, carbohydrate, protein and solids content.

While the present invention has been described with reference to specific embodiments thereof, it will be understood that numerous modifications may be made by those skilled in the art without actually departing from the scope of the claimed invention. Accordingly, all modifications and equivalents may be resorted to which fall within the scope of the invention as claimed.

I claim:

1. A method for making less than 1% by weight total carbohydrate, less than about 0.2% by weight fat, low calorie yogurt product containing fruit in an amount from 15 to 20% by weight of the yogurt product, said method comprising the steps of:
    (a) admixing pasteurized skim milk having a fat content of less than about 0.2% by weight, stabilizers and an amount of nonfat dry milk solids effective to improve texture and flavor, said nonfat dry milk solids being derived from a process in which condensed skim milk is subjected to non-coagulative direct steam heating prior to spray drying;
    (b) heating said mixture to a temperature in the range from about 190° to 195° F. (87.7° to 90.6° C.) for a time sufficient to form a uniform, substantially homogeneous mixture and to effect pasteurization;
    (c) homogenizing said pasteurized mixture at pressures in the range 500 to 5000 psig (35.15 to 351.5 kg/cm$^2$);
    (d) cooling said homogenized mixture to a temperature of about 90° to 120° F. (32.3° to 48.9° C.);
    (e) innoculating said cooled homogenized mixture with a lactic acid producing bacterial yogurt culture mixture consisting essentially of, by weight, 30-50% *Lactobacillus acidophilus,* balance *Lactobacillus bulgaricus* and *Streptococcus thermophilus* in approximately equal proportions;
    (f) maintaining said innoculated mixture at a temperature of about 90° to 120° F. (32.2° to 48.9° C.) for a time sufficient to produce a pH in the range of about 3.8 to 4.8 and to form an acceptable taste and texture in said innoculated mixture;
    (g) cooling said innoculated mixture to a temperature in the range 50° to 75° F. (10° to 23.9° C.);
    (h) forming said cooled innoculated mixture into a smooth textured product;
    (i) blending said smooth textured product with low calorie fruit preserves, said low calorie fruit preserves comprising about 40% to 50% by weight of fruit and a syrup for said fruit, said syrup including invert sugar containing at least 36% by weight fructose, said low calorie fruit preserves containing not more than 825 calories per pound (1817 calories per kilogram) thereof; and
    (j) cooling said blend of fruit preserves and smooth textured product to a temperature sufficiently low to stop fermentation.

2. A method for making a less than 1% by weight total carbohydrate, less than about 0.2% by weight fat, low calorie yogurt product containing fruit in an amount from 15 to 20% by weight of the yogurt product, said methods comprising the steps of:
    (a) admixing pasteurized skim milk having a fat content of less than about 0.2% by weight, stabilizers and an amount of nonfat dry milk solids effective to improve texture and flavor, said nonfat dry milk solids being derived from a process in which condensed skim milk is subjected to non-coagulative direct steam heating prior to spray drying;
    (b) heating said mixture to a temperature in the range from about 190° to 195° F. (87.7° to 90.6° C.) for a time sufficient to form a uniform, substantially homogeneous mixture and to effect pasteurization;
    (c) homogenizing said pasteurized mixture at pressures in the range 500 to 5000 psig (35.15 to 351.5 kg/cm$^2$);
    (d) cooling said homogenized mixture to a temperature of about 90° to 120° F. (32.2° to 48.9° C.);
    (e) innoculating said cooled, homogenized mixture with a lactic acid producing bacterial yogurt culture mixture consisting essentially of, by weight, 30-50% *Lactobacillus acidophilus,* balance *Lactobacillus bulgaricus* and *Streptococcus thermophilus* in approximately equal proportions;
    (f) adding said innoculated mixture into individual yogurt cups containing low calorie fruit preserves, said low calorie fruit preserves comprising about 40% to 50% by weight of fruit and a syrup for said fruit, said syrup including invert sugar containing at least 36% by weight fructose, said low calorie fruit preserves containing not more than 825 calories per pound (1817 calories per Kilogram) thereof;

(g) maintaining said fruit preserves and innoculated mixture at a temperature of about 90° to 120° F. (32.2° to 48.9° C.) for a time sufficient to produce a pH in the range of about 3.8 to 4.8 to form an acceptable taste and texture in said innoculated mixture; and (h) cooling said fruit preserves and innoculated mixture to a temperature sufficiently low to stop fermentation.

3. A method, as claimed in claims 1 or 2, wherein said skim milk has a fat content of less than about 0.1% by weight.

4. A method as claimed in claims 1 or 2, wherein the pH produced in said innoculated mixture is in the range of about 4.5 to 4.7.

5. A method, as claimed in claims 1 or 2, wherein said time sufficient in step (b) is from about 20 to 60 minutes.

6. A method, as claimed in claims 1 or 2, wherein said homogenizing is practiced in the pressure range 1000 to 2000 psig (70.03 to 140.06 kg/cm$^2$).

7. A method, as claimed in claims 1 or 2, wherein said temperature sufficiently low to stop fermentation is in the range from 35° to about 50° F. (1.6° to 10° C.).

8. A method, as claimed in claims 1 or 2, wherein said temperature sufficiently low to stop fermentation is in the range from 35° to 40° F. (1.6° to 4.4° C.).

9. The product of the process of claim 1.

10. The product of the process of claim 2.

* * * * *